(No Model.)
E. ABBE & P. RUDOLPH.
PHOTOGRAPHIC OBJECTIVE.
No. 435,271. Patented Aug. 26, 1890.
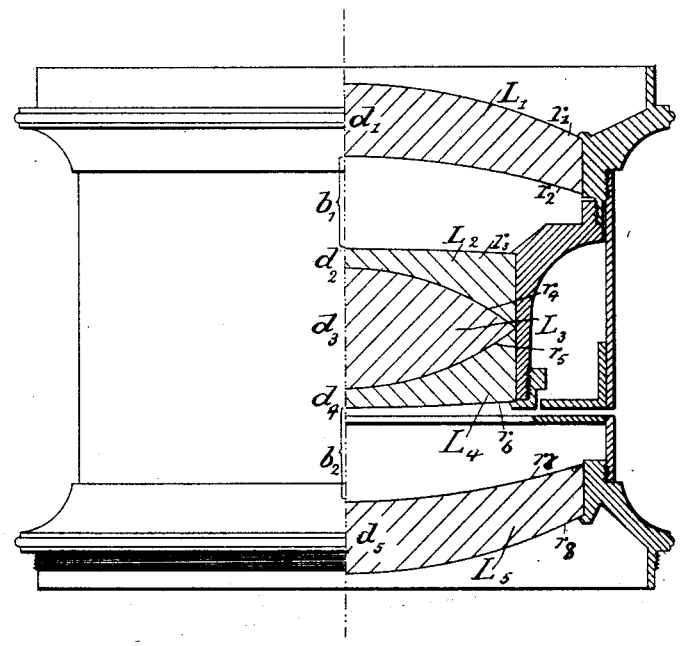
Witnesses.
William H. Shipley.
Ewell A. Dick.
Inventors.
Ernst Abbe and
Paul Rudolph
by Marcellus Bailey
his attorney.

UNITED STATES PATENT OFFICE.

ERNST ABBE AND PAUL RUDOLPH, OF JENA, SAXE-WEIMAR, GERMANY, ASSIGNORS TO CARL FEISS, OF SAME PLACE.

PHOTOGRAPHIC OBJECTIVE.

SPECIFICATION forming part of Letters Patent No. 435,271, dated August 26, 1890.

Application filed April 15, 1890. Serial No. 348,013. (No model.)

*To all whom it may concern:*

Be it known that we, ERNST ABBE, a subject of the Grand Duke of Saxe-Weimar, and PAUL RUDOLPH, a subject of the Duke of Saxe-Altenburg, both residing at Jena, in the Grand Duchy of Saxe-Weimar, Germany, have invented new and useful Improvements in Photographic Objectives, whereof the following is a specification.

Our invention relates to photographic objectives; and the improvement consists in the construction of a system of lenses in which the function of collecting the rays of light forming the image and that of correcting the spherical and chromatic aberration are allotted to distinct parts of the system.

In constructing photographic objective-glasses in which the advantage of an extended image-field is to be coupled with a large effective aperture particular difficulties are encountered in attaining the desired degree of absence of spherical aberration of the pencils of light that produce the image. In view of obtaining the extended field aimed at, objectives of the usual types require to be provided with lenses of high curvature, and these always give rise to certain residual spherical aberrations, (the so-called "zones,") whereby the distinctness of the image is impaired when the aperture is fully open. For the purpose of obviating this defect and simultaneously facilitating an improved correction of the chromatic aberration, we compose the objective of two uncorrected single collecting-lenses, which, in view of the aplanation of the field, have their convex or more convex sides turned outwardly and a correcting system possessing an infinite or a large, positive, or negative focal length, so that it does not at all, or but inconsiderably, alter the focal length of the two collecting-lenses combined, the said correcting system being constituted by two or three single lenses cemented together and arranged between and separate from the collecting-lenses. By means of this disposition it is possible to considerably diminish the aforesaid residual spherical aberration or zones. At the same time it gives a wider scope in the selection of the glasses to be employed in the manufacture of the lenses composing the correcting system. In particular it furnishes favorable conditions for the application of those kinds of glasses which have the property of almost completely uniting three colors of the spectrum, or, in other words, which neutralize the secondary spectrum, and thus produce a superior degree of chromatic correction. The construction therefore yields comparatively ready means for the manufacture of such highly-achromatic objectives as are called "apochromatic," according to the terminology introduced by Professor Abbe.

In the annexed drawing an objective carried out according to our invention is shown partly in outside view and partly in section.

$L_1$ and $L_5$ are the two collecting-lenses, made in this case of cancavo-convex form. The correcting system consists in the biconvex lens $L_3$ and the concavo-convex dispersing-lenses $L_2$ $L_4$, the two latter being composed of glass having such power of chromatic dispersion as is necessary to compensate the chromatic aberration of the lenses $L_1$, $L_3$, and $L_5$.

According to the kinds of glass used in the construction of the described objectives, and according to the special conditions to be realized by the total result obtainable from the system, a perfectly symmetrical arrangement of the lenses—such as is shown by Fig. 1—may in certain cases suffice. In others, where a wider range of means for corrections or for removing objectionable reflections is desired, a dissymmetrical arrangement may be preferable.

In the following tables we append three numerical exemplifications of the manner in which lenses of given kinds of glass have to be ground for carrying our invention into operation. In these tables the letters $r_1$ $r_2$ $r_3$ $r_4$ $r_5$ $r_6$ $r_7$ $r_8$ denote the radii of curvature of the lens-surfaces marked by the said letters in the figure. $d_1$ $d_2$ $d_3$ $d_4$ $d_5$ are the central thicknesses of the lenses, and $b_1$ $b_2$ the respective air distances between the lenses $L_1$ $L_2$ and $L_4$ $L_5$. All dimensions are expressed as fractions or multiples of the focal length of the entire system taken as unity. To obtain the dimensions of any particular objective, all that is necessary is to multiply the numerals given in the tables by the focal length required. The kinds of glass to which the tables refer are determined in the first example by the refractive indices $n_D$, $n_F$, and $n_{G'}$, corresponding to Fraunhofer's spectral lines D and F and the line $H_\gamma$ of the spectrum of hydrogen, respectively, whereas in the second and third examples the indices $n_D$ and $n_F$ only are employed.

I. *Symmetrical arrangement. Apochromatic correction, (the secondary spectrum removed.)*

| Radii. | Thicknesses of glass and air distances. |
|---|---|
| $r_1 = -r_8 = +0.2574$ | $d_1 = d_5 = 0.034$ |
| $r_2 = -r_7 = +0.3847$ | $d_2 = d_4 = 0.011$ |
| $r_3 = -r_6 = +2.3040$ | $d_3 = 0.056$ |
| $r_4 = -r_5 = +0.1374$ | $b_1 = b_2 = 0.042$ |

*Glasses employed.*

| | $n_D$. | $n_F$. | $n_{G'}$. |
|---|---|---|---|
| $L_1$ $L_3$ $L_5$ | 1.51840 | 1.52457 | 1.52956 |
| $L_2$ and $L_4$ | 1.57950 | 1.58745 | 1.59388 |

Position of diaphragm close behind lens $L_4$. Largest effective aperture 0.16. Angle of field about ninety degrees.

II. *Unsymmetrical arrangement. Achromatic correction.*

| Radii. | Thicknesses of glass and air distances. |
|---|---|
| $r_1 = +0.2473$ | $d_1 = 0.033$ |
| $r_2 = +0.3707$ | $d_2 = 0.010$ |
| $r_3 = +2.2000$ | $d_3 = 0.062$ |
| $r_4 = +0.1324$ | $d_4 = 0.011$ |
| $r_5 = -0.1452$ | $d_5 = 0.036$ |
| $r_6 = -2.4350$ | $b_1 = 0.041$ |
| $r_7 = -0.4272$ | $b_2 = 0.044$ |
| $r_8 = -0.2798$ | |

*Glasses employed.*

| | $n_D$. | $n_{G'}$. |
|---|---|---|
| $L_1$ $L_3$ $L_5$ | 1.50932 | 1.52037 |
| $L_2$ and $L_4$ | 1.56808 | 1.58231 |

Position of diaphragm close behind lens $L_4$. Largest effective aperture 0.16. Angle of field about ninety degrees.

III. *Symmetrical arrangement. Achromatic correction.*

| Radii | Thicknesses of glass and air distances. |
|---|---|
| $r_1 = -r_8 = 0.4401$ | $d_1 = d_5 = 0.050$ |
| $r_2 = -r_7 = 1.3503$ | $d_2 = d_4 = 0.020$ |
| $r_3 = -r_6 = \infty$ | $d_3 = 0.130$ |
| $r_4 = -r_5 = 0.2001$ | $b_1 = b_2 = 0.100$ |

*Glasses employed.*

| | $n_D$. | $n_{G'}$. |
|---|---|---|
| $L_1$ $L_3$ $L_5$ | 1.51780 | 1.52901 |
| $L_2$ and $L_4$ | 1.56745 | 1.58233 |

Position of diaphragm close behind lens $L_4$. Largest effective aperture 0.30. Angle of field about fifty degrees.

We claim as our invention—

In a photographic objective, the combination of two single collecting-lenses and a compound correcting system composed of single lenses cemented together, the said correcting system having a large focal length and being placed between the collecting-lenses, substantially as described.

In testimony whereof we have hereunto set our hands in the presence of two subscribing witnesses.

ERNST ABBE.
PAUL RUDOLPH.

Witnesses:
CARL BORNGRAEBER,
HENRY W. DIEDERICH.

It is hereby certified that the name of the assignee in Letters Patent No. 435,271, granted August 26, 1890, upon the application of Ernst Abbe and Paul Rudolph, of Jena, Saxe-Weimar, Germany, for an improvement in "Photographic Objectives," was erroneously written and printed "Carl Feiss," whereas said name should have been written and printed *Carl Zeiss;* and that the said Letters Patent should be read with this correction therein that the same may conform to the corrected files and records of the case in the Patent Office.

Signed, countersigned, and sealed this 30th day of September, A. D. 1890.

CYRUS BUSSEY,
*Assistant Secretary of the Interior.*

[SEAL.]

Countersigned:
   C. E. MITCHELL,
     *Commissioner of Patents.*